Jan. 3, 1928.
C. M. BROWN
PUZZLE
Filed March 14, 1925
1,655,216
2 Sheets-Sheet 1
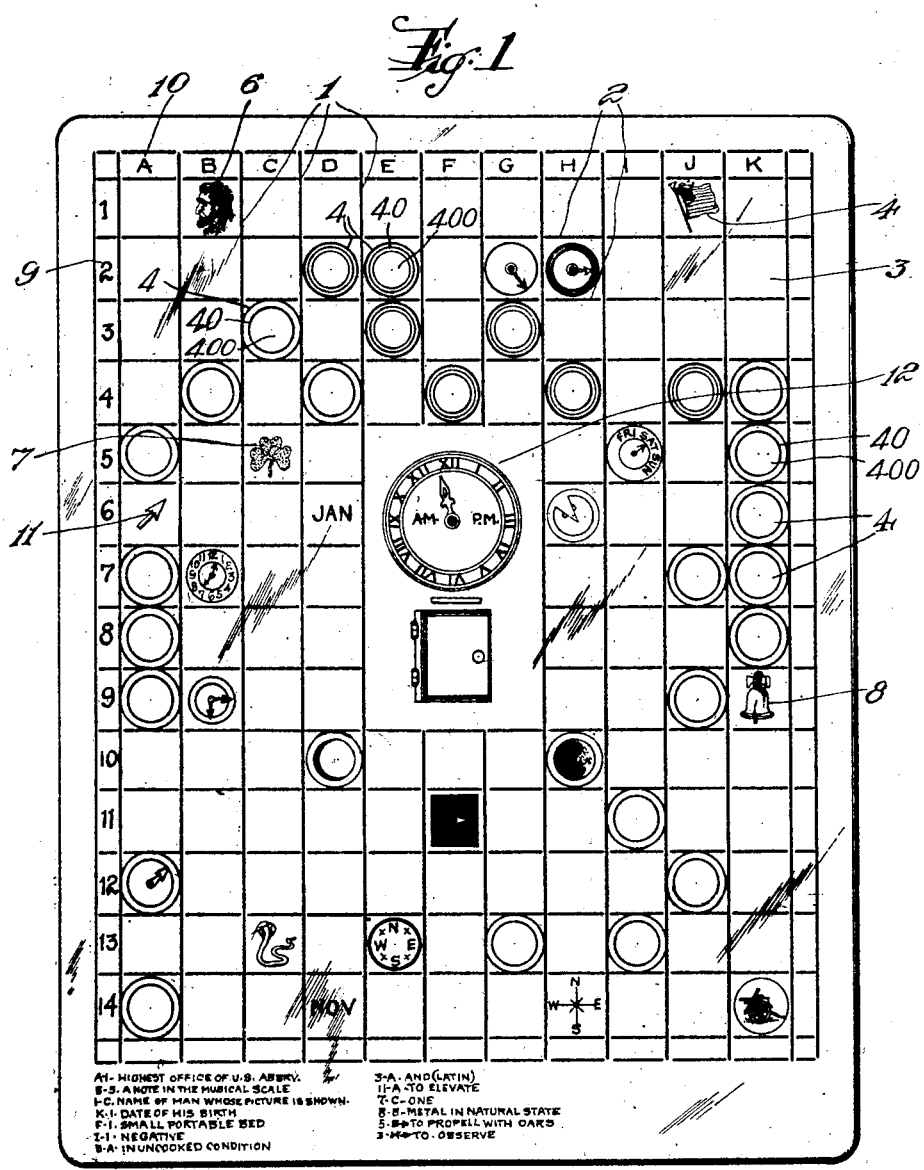
Fig. 1
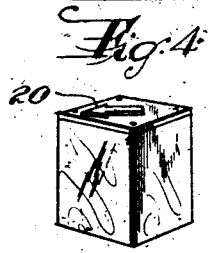 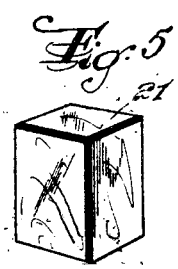 
Fig. 4  Fig. 5  Fig. 6
INVENTOR.
Cornelius M. Brown,
BY Everett W. Cook,
ATTORNEYS.

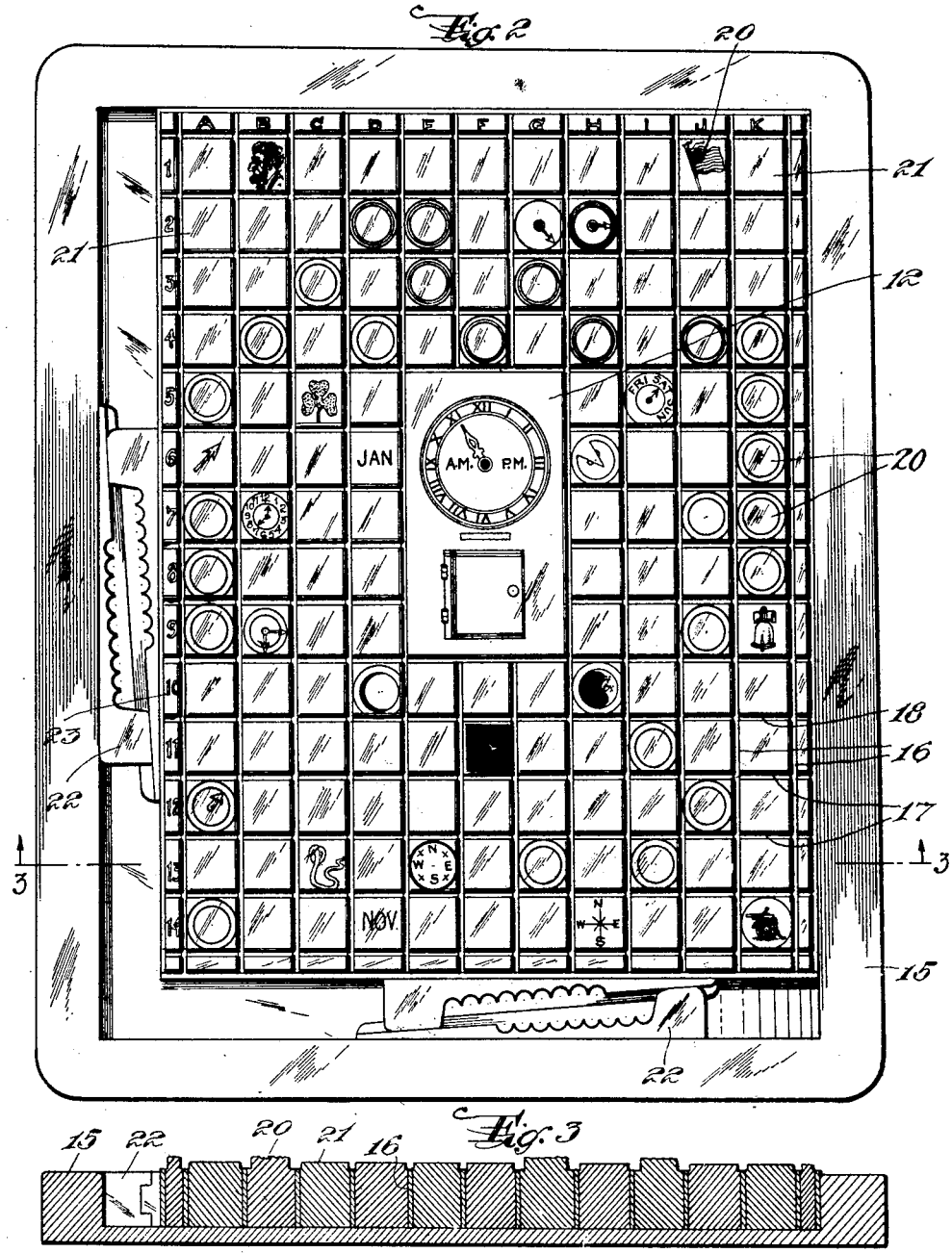

Patented Jan. 3, 1928.

1,655,216

UNITED STATES PATENT OFFICE.

CORNELIUS M. BROWN, OF NEWARK, NEW JERSEY.

PUZZLE.

Application filed March 14, 1925. Serial No. 15,479.

This invention relates particularly to what are known as cross-word puzzles, although the invention is susceptible of embodiment in other types of puzzles or games.

One object of the invention is to provide a puzzle or game apparatus of this character embodying a novel and improved construction and cooperation of parts some of which are interchangeable whereby a number of different puzzles or designs may be produced by mere rearrangement or interchanging of the parts.

Another object is to provide a device of the character described including a frame and a plurality of blocks some of which have pictures, figures or other indicative or descriptive inscriptions or characters and others of which have plain or blank faces or sides, said blocks being arrangeable in said frame interchangeably in different relations for example with the blocks having the figures, descriptive characters, etc., (hereinafter called "character blocks") arranged in relation to the plain blocks similar to the relation of black squares or spaces to the white squares in the usual cross-word puzzle, and the characters on said character blocks being such as to serve as guides for filling words, etc., in the blank spaces formed by the plain blocks, or consisting of pictures or data related to the words to be placed in the blank spaces; for instance a character block having a picture of Lincoln might be arranged adjacent a number of plain blocks upon which it is intended that a word relating to the subject of the picture be filled in, e. g., the name "Lincoln."

Other objects are to provide a novel and improved means for indicating or referring to said blank spaces or plain blocks; to so form the faces of said plain blocks as to render them capable of removably receiving inscriptions as by pencil or chalk, and to obtain other results and advantages as may be brought out by the following description.

Referring to the accompanying drawings in which the same reference characters designate corresponding and like parts throughout the several views, Figure 1 is a plan view of a cross-word puzzle embodying the invention;

Figure 2 is a plan view of a cross-word puzzle apparatus for enabling the production of a plurality of different cross-word puzzle diagrams;

Figure 3 is a transverse vertical sectional view taken on the line 3—3 at Figure 2;

Figure 4 is a perspective view of one of the character blocks;

Figure 5 is a similar view of one of the plain blocks, and

Figure 6 is a perspective view of one of the blocks carrying characters for designating the rows of spaces or blocks.

The cross-word puzzle embodying the invention consists of a rectangular playing surface comprising a plurality of spaced and right angularly disposed lines 2 which form a plurality of substantially square spaces. Some of these spaces, in the present instance those designated 3, are blank or plain, while others of the spaces, those designated 4 have pictures, figures or other indicative or descriptive characters or inscriptions. The spaces 4 are so arranged relative to the spaces 3 as to produce a design, and also so that the blank spaces 3 are adapted to receive inscriptions such as words, and certain of the characters of the spaces 4 are indicative of proper inscriptions to be filled in the adjacent blank spaces 3. These spaces 4 also serve to indicate the beginning and the ending of the inscription, in the manner of the known cross-word puzzle. Some of the spaces 4 may have circles or other distinguishing marks, as indicated at 40, and blank spots 400 to receive inscriptions so that such spaces may serve both as indications of the beginning and ending of the inscriptions to be placed in the blank spaces 3 and also to receive other inscriptions.

The characters of the spaces 4 may be of any desired nature or significance indicated by a picture or symbol. For instance, where a number of adjacent blank spaces 3 are intended to be filled in with the name "Lincoln", one of the character spaces 4 might have a picture of Abraham Lincoln, as indicated at 6. This picture of Lincoln would thus be indicative of the proper word to be filled in the adjacent blank spaces when considered with suitable directions hereinafter referred to. Similarly, March 17 might be indicated by a shamrock as at 7 and the date "1776" might be indicated by a Liberty Bell 8.

For indicating or referring to the spaces 3, a plurality of numbers 9 are arranged along one side of the diagram, one of said numbers indicating each of the horizontal rows of spaces; and a plurality of other indicating characters such as the letters 10 are arranged along a meeting side of the diagram and each indicates one of the vertical rows of spaces. Directions accompany each of the diagrams to apprise the puzzle solver of the nature of the inscriptions to be placed in the blank spaces 3. Such directions are briefly illustrated in Figure 1 of the drawing.

In referring to the spaces where the inscription to be filled in is intended to read horizontally, the character 9 indicating the horizontal row is first mentioned and the character 10 indicating the vertical row in which the inscription begins is mentioned secondly; for instance, the inscription beginning in the space immediately to the right of Lincoln would be indicated as 1—C. The space immediately below the representation of the shamrock 7 for the beginning of the word reading vertically would be referred to as C—6.

My invention also contemplates an arrangement whereby certain inscriptions may be inserted diagonally of the diagram, and where this is desired, the character in the space indicating the beginning of the diagonal word might have an arrow 11 pointing in the direction of the reading of the inscription, and the directions for filling in such an inscription might read 5—B —→. This reference indicates that the word is to begin in the space formed at the intersection of columns 5 and B and that the word is to be filled in in the direction of the arrow next adjacent the space of the first letter of the word. In all cases except as controlled by an arrow 11, the inscriptions are applied to the blank spaces to read horizontaly from left to right, or vertically downward.

In some instances the puzzle may include other descriptive, indicative or pictorial matter 12. For instance, the theme of the puzzle might be mysterious events and the time of their occurrence which might be symbolically indicated by a clock face and a closed door, as shown, or a historic event or the life of a great man, in which cases the matter 12 might be illustrations relating to the historic event or events in the life of the man.

The invention also contemplates the production of an apparatus in which a large number of different playing surfaces, or puzzles may be produced. Accordingly, I may provide an apparatus including a rectangular frame 15 and a plurality of partition members or strips 16 and 17. The partition members 16 may be of a variety of lengths and are intended to extend the full length of the puzzle diagram which it is desired to construct. The partition members 17 may be of all the same length and are adapted to be interposed between adjacent partition members 16 to form a plurality of recesses or sockets 18. A plurality of substantially cubical blocks 19 are provided to fit the sockets or recesses 18. Some of these blocks have characters thereon as indicated at 20, while others are blank or plain as at 21 and the blocks are arranged in the relation described in connection with the spaces 3 and 4 of Figure 1. For clamping the partition members 16 and 17 within the frame 15, I may provide any suitable devices such as printers' quoins 22. With this construction it will be obvious that the size of the puzzle may be readily varied by varying the number and size of the partition members 16 and 17 and that the blocks 21 and 20 may be interchangeably arranged in the sockets or recesses to produce a number of different diagrams.

For indicating the various blocks, indicating characters corresponding to the characters 9 and 10 of Figure 1 may be placed upon narrow blocks 23 which are arranged in correspondingly shaped recesses formed by the partition members 16 and 17 along two meeting sides of the diagram.

Preferably the blank or plain blocks 21 have their surfaces so formed as to erasably receive inscriptions; for instance, the surfaces of the blocks may be similar to a black-board or a slate.

While I have shown and described a puzzle and puzzle apparatus embodying certain details of design and construction, it will be understood that this is mainly for the purpose of illustrating the principles of the invention and that many modifications and changes may be made in the details of construction and design without departing from the spirit or scope of the invention. The term "playing surface" as used in the appended claims is intended to cover both the construction shown in Figure 1 and the construction shown in Figure 2; obviously the exposed faces of the blocks in the construction shown in Figure 2 compose a playing surface in the same manner as do the spaces 3 and 4 in the construction of Figure 1. Therefore, I do not desire to be understood as limiting myself except as required by the following claims when construed in the light of the prior art.

Having thus described the invention, what I claim is:

1. A puzzle comprising a playing surface formed of a plurality of lines defining spaces, the spaces defined by the lines being arranged side by side, certain of said spaces being plain or blank to be filled in with certain inscriptions and others of said spaces having characters therein indicative of the proper inscriptions to be placed in the blank spaces adjacent the last-mentioned spaces.

2. A puzzle comprising a rectangular playing surface formed of two right angularly disposed series of lines defining two series of rows of spaces, the rows of each series being arranged side by side and certain of said spaces being blank to be filled in with suitable inscriptions and others indicating the starting or ending points of such inscriptions, the rest of said spaces having each an indicium of the direction of filling in certain of said inscriptions in adjacent blank spaces, said diagram having a series of indicative characters on each of two meeting sides of said diagram one for each of said rows of spaces.

3. A puzzle comprising a rectangular playing surface formed of two right angularly disposed series of lines defining two series of rows of spaces, the rows of each series being arranged side by side and certain of said spaces being blank to be filled in with suitable inscriptions and others having characters thereon indicative of the proper inscription to be made in adjacent blank spaces, others of said spaces having each an indicium of the direction of filling in inscriptions in said blank spaces, said diagram having a series of indicative characters on each of two meeting sides of said diagram one for each of said rows of spaces.

4. A puzzle comprising a rectangular playing surface formed of two right angularly disposed series of lines defining two series of rows of spaces, the rows of each series being arranged side by side and certain of said spaces being entirely blank to be filled in with suitable inscriptions and certain other spaces each having lines defining blank spaces to receive inscriptions and characters to indicate the starting or ending points of such inscriptions, whereby all of said certain spaces may be utilized to receive inscriptions and the inscriptions may read horizontally, vertically and diagonally of said diagram.

5. A puzzle comprising a rectangular playing surface formed of two right angularly disposed series of lines defining two series of rows of spaces, the rows of each series being arranged side by side and certain of said spaces being blank to be filled in with suitable inscriptions, others of said spaces each having a character indicative of the proper inscriptions to be made in the blank spaces adjacent the last-mentioned spaces and also serving to indicate the beginning and ending of the inscriptions to be made in said blank spaces.

CORNELIUS M. BROWN.